US012135717B1

(12) United States Patent
Duraisamy et al.

(10) Patent No.: US 12,135,717 B1
(45) Date of Patent: Nov. 5, 2024

(54) CLOUD SERVICE VALIDATION FOR MULTIPLE PROGRAMMING STACKS

(71) Applicant: SAP SE, Walldorf (DE)

(72) Inventors: Ganesh Moorthy Duraisamy, Chinnamadham Palayam (IN); Abhishek Mishra, Bangalore (IN); Velliangiri Shanmugam, Bangalore (IN); Archana Pinnamraju Venkataramanamoorthy, Bangalore (IN); Shreepathi Kukkila, Bantwal Taluk (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/202,137

(22) Filed: May 25, 2023

(51) Int. Cl.
*G06F 16/00* (2019.01)
*G06F 16/242* (2019.01)
*G06F 16/2455* (2019.01)

(52) U.S. Cl.
CPC ...... *G06F 16/2455* (2019.01); *G06F 16/2448* (2019.01)

(58) Field of Classification Search
CPC . H04L 67/10; H04L 41/5051; H04L 43/0852; G06F 2009/4557; G06F 2009/45587; G06F 2009/45595; G06F 8/60; G06F 9/45558; G06F 11/3006; G06F 16/90335; G06F 16/9535
See application file for complete search history.

(56) References Cited

U.S. PATENT DOCUMENTS

| 2015/0321098 A1* | 11/2015 | van der Laan | .... H04N 21/6125 463/31 |
| 2019/0306138 A1* | 10/2019 | Carru | ...................... H04L 63/10 |
| 2024/0031263 A1* | 1/2024 | Totappanavar | ..... H04L 43/0811 |

* cited by examiner

*Primary Examiner* — Shyue Jiunn Hwa
(74) *Attorney, Agent, or Firm* — SCHWEGMAN LUNDBERG & WOESSNER, P.A.

(57) ABSTRACT

Techniques for validating a cloud service for multiple programming stacks are disclosed. A computer system may configure a corresponding set of requests for each programming stack client in a plurality of programming stack clients based on usage metrics of a cloud service. Each programming stack client in the plurality of programming stack clients may be configured to be used to build a software application for the cloud service. The usage metrics may indicate historical requests executed on the cloud service via the plurality of programming stack clients. The computer system may then, for each programming stack client in the plurality of programming stack clients, trigger execution of the corresponding set of requests for the programming stack client on the cloud service via the programming stack client.

20 Claims, 7 Drawing Sheets

MULTI-STACK VALIDATION RESULTS

| REQUEST | PROGRAMMING STACK CLIENTS | | |
|---|---|---|---|
| | ABAP® | PYTHON® | NODE.JS® |
| CREATE GRAPH WITH EDGE TABLE AND NODE TABLE | PASSED | PASSED | PASSED |
| CREATE GRAPH WITH ONLY EDGE TABLE | PASSED | PASSED | FAILED |
| ADDITIONAL ALGORITHM BETWEENNESS CENTRALITY | PASSED | PASSED | PASSED |
| SUPPORT TUDFS WITH GRAPH SCRIPT | FAILED | PASSED | SKIPPED |
| ANONYMOUS BLOCK WITH GRAPH SCRIPT | PASSED | PASSED | PASSED |
| GRAPH WORKSPACE CREATION | PASSED | SKIPPED | PASSED |

DOWNLOAD    RE-RUN

FIG. 4

CLOUD SERVICE VALIDATION FOR MULTIPLE PROGRAMMING STACKS

BACKGROUND

Cloud services comprise software, platforms, or infrastructure that are hosted by cloud service providers and made available for use by users through the Internet. Some cloud services enable users to build software applications through various programming stacks. A programming stack is a bundle of components, such as tools, frameworks, technologies, and languages, that go into composing a system and enable users to develop software applications.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4 illustrates an example graphical user interface in which results of execution of sets of requests on a cloud service are displayed.

DETAILED DESCRIPTION

Figure 1:
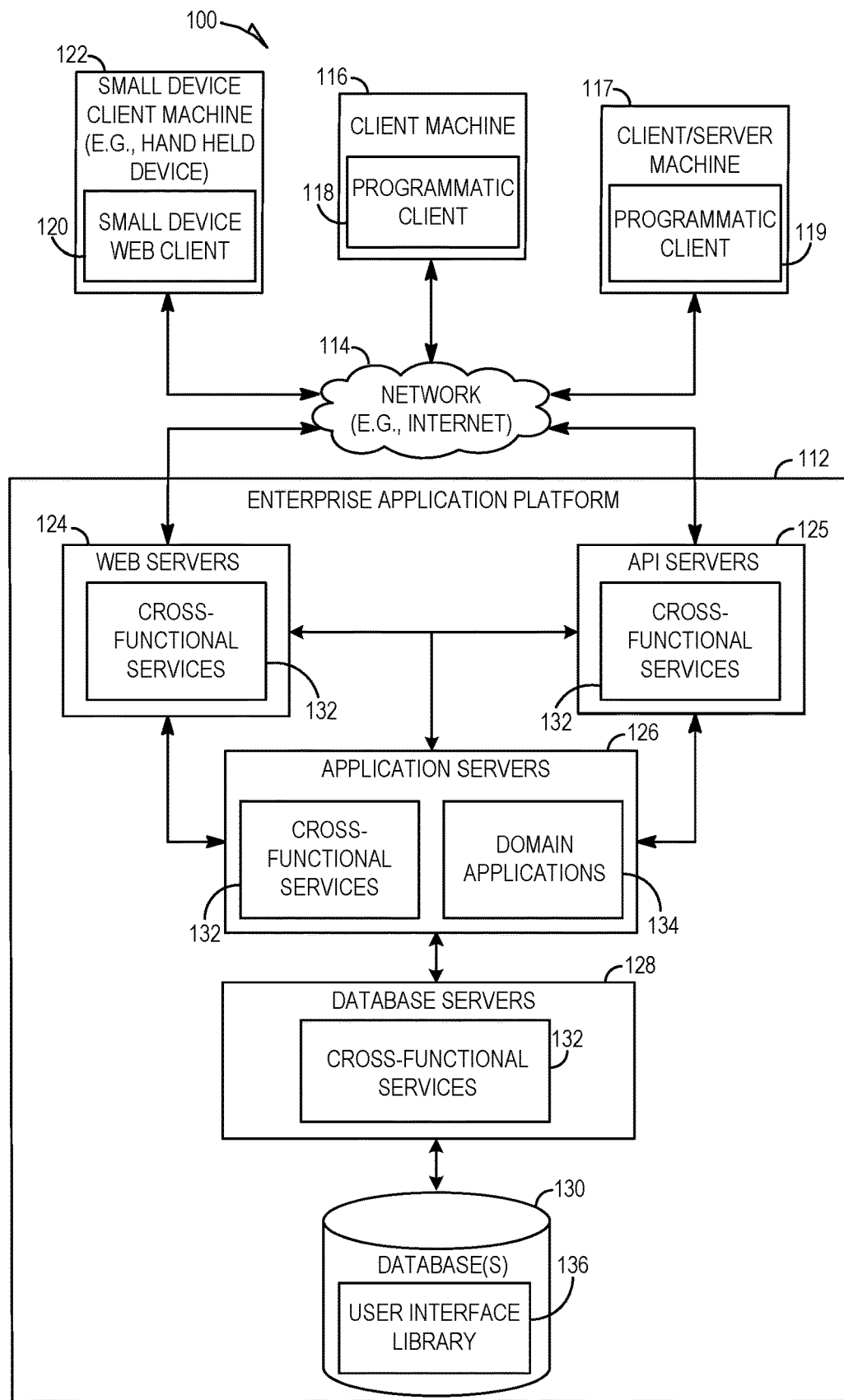
FIG. 1 is an example network diagram illustrating a system.

Example methods and systems of validating a cloud service for multiple programming stacks are disclosed. In the following description, for purposes of explanation, numerous specific details are set forth in order to provide a thorough understanding of example embodiments. It will be evident, however, to one skilled in the art that the present embodiments can be practiced without these specific details.

Cloud services may receive workload requests from various kinds of programming stack clients. For example, a cloud service may receive transactional workload request from an Advanced Business Application Programming (ABAP)® client and analytical workload requests from a Node.js® client. Current validation systems do not reflect this variation in workload patterns, but rather validate a cloud service with a single programming stack client. As a result, current validation systems fail to detect errors that are specific to certain programming stack clients, such as certain syntax errors or data errors that are specific to a particular client, thereby leaving the cloud service vulnerable to functional problems related to these client-specific errors. Other technical challenges may arise as well.

The implementation of the features disclosed herein involves a non-generic, unconventional, and non-routine operation or combination of operations. By applying one or more of the solutions disclosed herein, some technical effects of the system and method of the present disclosure are to provide cloud service validation for multiple programming stacks. In some example embodiments, a computer system configures a corresponding set of requests for each programming stack client in a plurality of programming stack clients based on usage metrics of a cloud service. Each programming stack client in the plurality of programming stack clients may be configured to be used to build a software application for the cloud service. The usage metrics may indicate historical requests executed on the cloud service via the plurality of programming stack clients. Next, the computer system may, for each programming stack client in the plurality of programming stack clients, trigger execution of the corresponding set of requests for the programming stack client on the cloud service via the programming stack client.

By orchestrating the execution of workload requests on a cloud service via multiple programming stack clients based on usage metrics that indicate historical requests executed on the cloud service via the multiple programming stack clients, the features of the present disclosure improve the validation of the cloud service, as the workload requests that are used to validate the cloud service are configured to reflect the actual workload requests handled by the cloud service. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
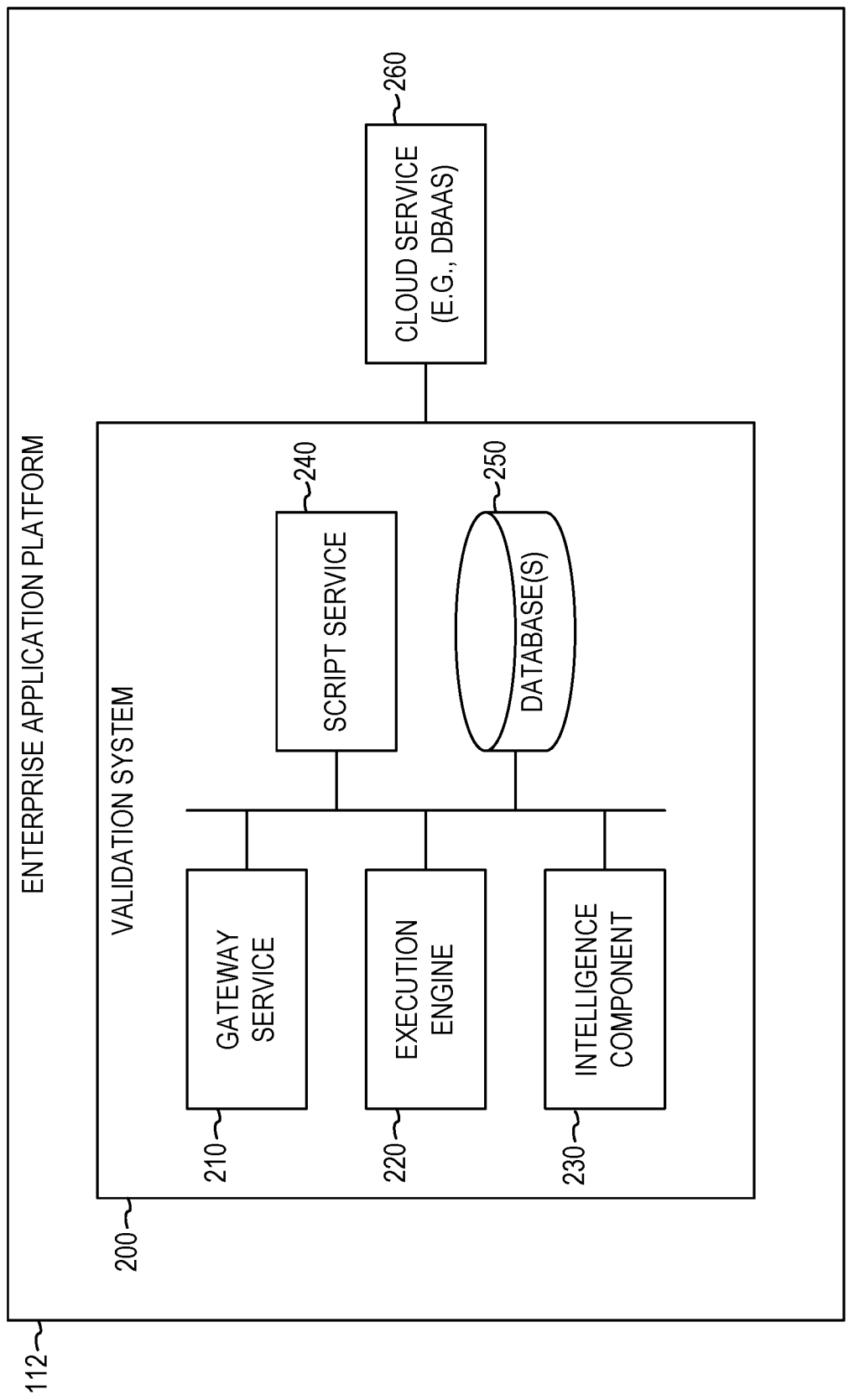
FIG. 2 is a block diagram illustrating an example validation system.

FIG. 2 is a block diagram illustrating an example validation system 200. The validation system 200 may be configured to perform a validation process for a cloud service 260. In some example embodiments, the cloud service 260 comprises a database-as-a-service (DBaaS). A DBaaS is a cloud database offering that provides customers with access to a database without having to deploy and manage the underlying infrastructure. The database may run on a cloud computing platform and access to the database may be provided as-a-service, where users pay fees to a cloud provider for services and computing resources. The cloud service 260 may provide tools to users enabling them to create and manage database instances. Other types and configurations of cloud services 260 are also within the scope of the present disclosure.

In some example embodiments, the validation system 200 may comprise a gateway service 210, an execution engine 220, an intelligence component 230, a script service 240, and one or more databases 250. The gateway service 210, the execution engine 220, the intelligence component 230, the script service 240, and the database(s) 250, as well as the cloud service 260, may be implemented as cloud-based components by the enterprise application platform 112 of FIG. 1, such as by being incorporated into the application server(s) 126, the database server(s) 128, or the database(s) 130 of the enterprise application platform 112. However, the components of the validation system 200, as well as the cloud service 260, may be implemented in other ways as well. The components of the validation system 200 may communicate with one another, as well as with the cloud service 260, via a network connection.

The validation system 200 may be configured to orchestrate the execution of requests on the cloud service 260 from different programming stack clients. The requests may comprise requests to perform one or more actions on the cloud service 260, such as on one or more database tables being hosted by the cloud service 260. Other types of requests are also within the scope of the present disclosure.

Figure 3:
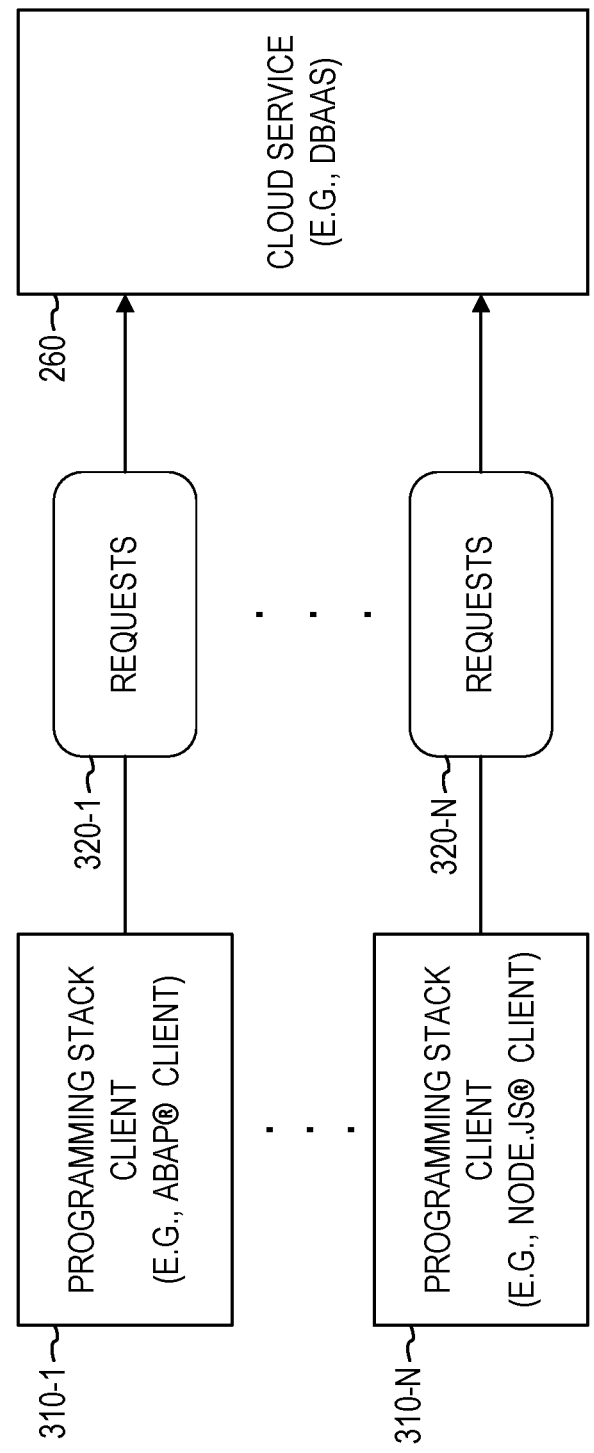
FIG. 3 illustrates an example of sets of requests being executed on a cloud service via a plurality of programming stack clients.

FIG. 3 illustrates an example of sets of requests 320 being executed on the cloud service 260 via a plurality of programming stack clients 310 (e.g., programming stack clients 310-1 to 310-N). Each programming stack client 310 may be configured to be used to build a software application for the cloud service 260. Examples of programming stack clients 310 include, but are not limited to, ABAP® clients, Node.js® clients, JAVA® clients, and Go (also referred to as Golang) clients. Other types of programming stack client 310 are also within the scope of the present disclosure.

Each programming stack client 310 may be used to execute its own corresponding set of requests 320 on the cloud service 260 (e.g., set of requests 320-1 for programming stack client 310-1, . . . , set of requests 320-N for programming stack client 310-N). The validation system 200 may be configured to configure the corresponding set of requests 320 for each programming stack client 310. Referring back to FIG. 2, the gateway service 210 may be configured to access a list of requests 320 stored in the database 250 using the script service 240. The database 250 may store a comprehensive set of requests 320 for use by the validation system 200. In some example embodiments, the comprehensive set of requests stored in the database 250 is formed by receiving request feature definitions (e.g., component selection, syntax, etc.) submitted by a user via a computing device, multiplexing the request feature definitions to generate requests based on different combinations of the different request feature definitions, and storing the generated requests in the database 250. The multiplexing results in the generation of an exponential combination of requests, such as millions of queries available to be run against the cloud service 260 for validation. However, executing all of the available requests stored in the database 250 for each programming stack client 310 in the plurality of programming stack clients 310 overloads the validation system 200 and the cloud service 260, which negatively affects the functioning of the validation system 200 and the cloud service 260.

In order to improve the efficiency of the validation process, the validation system 200 may be configured to configure the corresponding set of requests 320 for each programming stack client 310 based on usage metrics of the cloud service 260. The usage metrics may indicate historical requests executed on the cloud service 260 via the plurality of programming stack clients 310. The usage metrics may be restricted to only those usage metrics that correspond to historical requests executed within a most recent period of time, such as restricting the usage metrics to those usage metrics that correspond to historical requests that were executed within the last 30 days. The intelligence component 230 may be configured to collect the usage metrics from the cloud service 260. The usage metrics may include, but are not limited to, what kind of workload requests come from which programming stack clients 310 (e.g., transactional queries, analytical queries, graph queries, spatial queries), how much of volume of data is processed from specific types of queries, what data pattern is used for queries (e.g., max and min values used for a specific feature), a number of partitions being queried or otherwise targeted by requests, a volume of requests for each programming stack client 310, combination of features used for requests executed using each programming stack client 310, and configuration of the cloud service 260 (e.g., scaleout node count). Other types of usage metrics are also within the scope of the present disclosure.

The gateway service 210 may provide the list of requests obtained from the database 250 and the usage metrics obtained from the intelligence component 230 to the execution engine 220. The execution engine 220 may be configured to determine how to orchestrate the validation of the cloud service 260 based on an orchestration logic that configures the corresponding set of requests 320 to be used for each programming stack client 310. The orchestration logic may comprise mapping types of requests from the list of requests obtained from the database 250 to programming stack clients 310 based on indications in the usage metrics of what type of requests were previously executed using the programming stack clients. Certain types of requests may be included in the corresponding sets of requests 320 across multiple programming stack clients 310, as these types of requests may be basic and more commonly used, whereas other types of requests may only be included in the corresponding set of requests 320 for only a subset of the plurality of programming stack clients 310. The execution engine 220 may further In some example embodiments, the execution engine 220 may map one or more request types to each programming stack client 310 in the plurality of programming stack clients 310 based on corresponding request types of the historical requests executed on the cloud service 260 via the programming stack client 310, as indicated by the usage metrics. The one or more request types may comprise one or more types of queries. For example, the one or more request types may comprise a combination of one or more of collection SQL queries, graph SQL queries, transactional SQL queries, or analytical SQL queries. However, other types of request types and other types of queries are also within the scope of the present disclosure.

The execution engine 220 may configure the corresponding set of requests 320 for the programming stack client 310 to be of the one or more request types mapped to the programming stack client 310. For example, the validation system 200 may configure the corresponding set of requests 320 for a first programming stack client 310 to include collection SQL queries and transactional SQL queries based on collection SQL queries and transaction SQL queries being mapped to the first programming stack client 310, while the validation system 200 may configure the corresponding set of requests 320 for a second programming stack client 310 to include collection SQL queries and analytical SQL queries based on collection SQL queries and analytical SQL queries being mapped to the second programming stack client 310.

The execution engine 220 may also be configured to specify test data on which to execute a set of queries based on the usage metrics. For example, in a scenario where the usage metrics indicate that the historical requests executed on the cloud service 260 via a particular programming stack client 310 comprised queries that were performed on a particular portion of a database (e.g., specific tables, rows, columns, partitions, etc.), the validation system 200 may configure the set of requests 320 for that particular programming stack client 310 to comprise queries to be performed on the same particular portion of the database.

Additionally or alternatively, the execution engine 220 may be configured to configure a corresponding volume of the set of requests 320 for each programming stack client 310 based on a corresponding volume of the historical requests for the programming stack client 310 indicated by the usage metrics. For example, in a scenario where the usage metrics indicate that the total number of times that a particular type of query was executed on the cloud service 260 via a particular programming stack client 310 within the last 30 days is 1,328, the validation system 200 may configure the set of requests 320 for that particular programming stack client 310 to comprise 1,328 queries of that particular type of query.

In some example embodiments, the execution engine 220 may, for each programming stack client 310 in the plurality of programming stack clients 310, trigger execution of the corresponding set of requests 320 for the programming stack client 310 on the cloud service 260 via the programming stack client 310, at operation 520. For example, the execution engine 220 may send one or more instructions to each programming stack client 310 to execute the corresponding set of requests 320 for the programming stack client 310 on the cloud service 260. The one or more instructions may include the set of requests 320.

The gateway service 210 may obtain results of the execution of the sets of requests 320 for the plurality of programming stack clients 310 on the cloud service 260. For example, the sets of requests 320 may be executed on the cloud service 260, and the results of the execution of the sets of requests 320 may be stored in the database 250, from which the gateway service 210 may obtain the stored results, such as for use in further validation operations. The gateway service 210 may be configured to cause an indication of the results to be displayed on a computing device. For example, the gateway service 210 may perform one or more validation operations to compute a summary of the results for the different requests 320 for each programming stack client 310, such as corresponding indications of whether each request 320 passed or failed a validation standard (e.g., one or more criteria).

FIG. 4 illustrates an example graphical user interface 400 in which results of execution of sets of requests 320 on a cloud service are displayed. In FIG. 4, the results are displayed in a table that indicates for each request 320 that was executed as part of the validation process, a corresponding indication of whether the corresponding result of the execution either passed the validation process for the corresponding programming stack client 310, failed the validation process for the corresponding programming stack client 310, or skipped the validation process for the corresponding programming stack client 310. The passing of the validation process may be based on a determination that data that was output as a result of the execution of the request 320 satisfied one or more validation criteria. The failing of the validation process may be based on a determination that data that was output as a result of the execution of the request 320 failed to satisfy one or more validation criteria. The skipping of the validation process may be based on the request 320 not being executed via the programming stack client 310.

Figure 5:
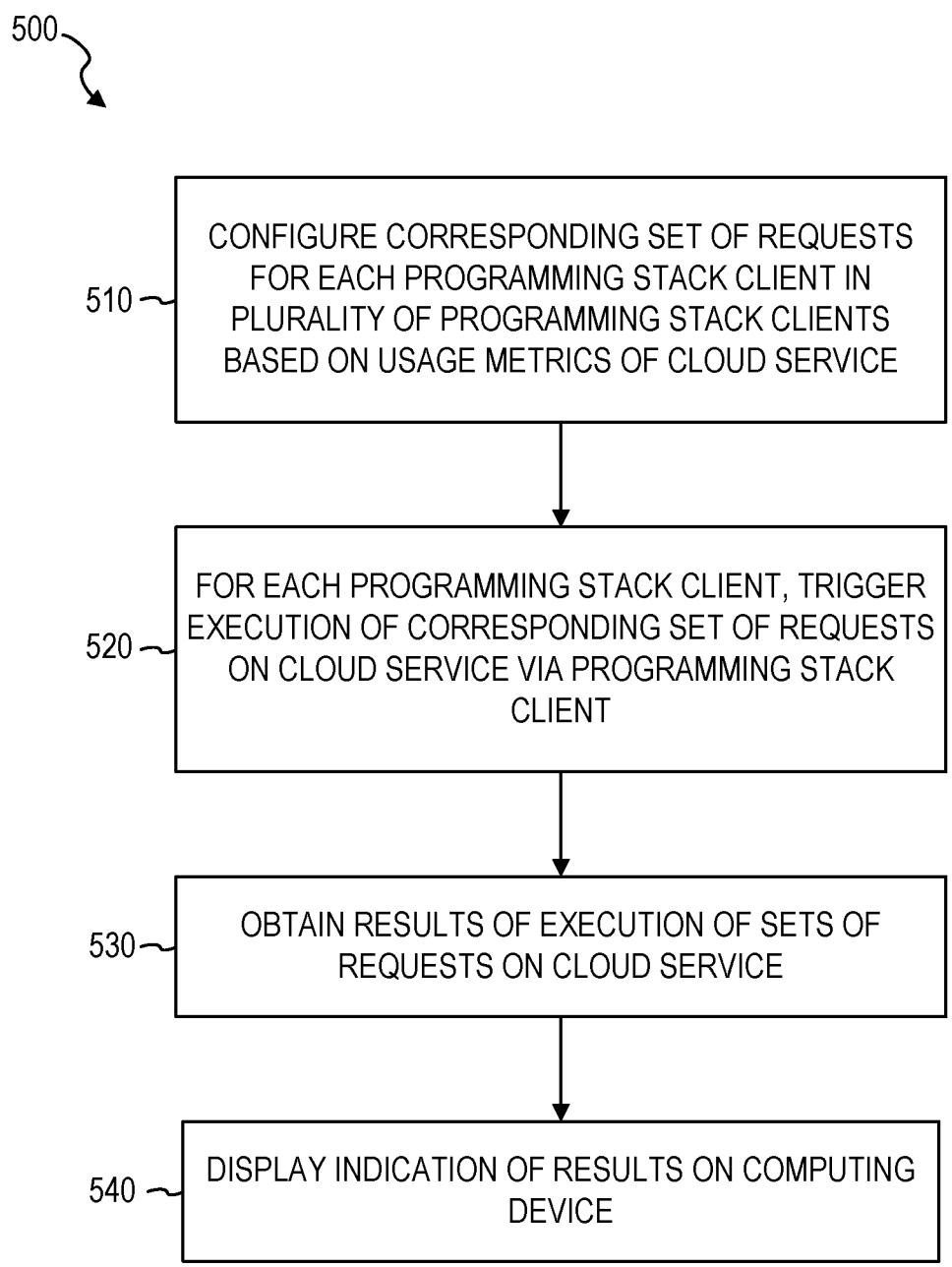
FIG. 5 is a flowchart illustrating an example method of validating a cloud service for multiple programming stacks.

FIG. 5 is a flowchart illustrating an example method of validating a cloud service for multiple programming stacks. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by one or more components of the validation system 200 of FIG. 2.

At operation 510, the validation system 200 may configure a corresponding set of requests 320 for each programming stack client 310 in a plurality of programming stack clients 310 based on usage metrics of a cloud service 260. In some example embodiments, the cloud service 260 may comprise a DBaaS. However, other types of cloud services 260 are also within the scope of the present disclosure. Each programming stack client 310 may be configured to be used to build a software application for the cloud service 260. The usage metrics may indicate historical requests executed on the cloud service 260 via the plurality of programming stack clients 310. The usage metrics may be restricted to only those usage metrics that correspond to historical requests executed within a most recent period of time, such as restricting the usage metrics to those usage metrics that correspond to historical requests that were executed within the last 30 days.

The corresponding set of requests 320 for each programming stack client 310 may comprise a set of queries. Each query may comprise a request for data results from one or more databases hosted by the cloud service 260 (e.g., a data retrieval query) or for an action to be performed on data stored by the cloud service 260 (e.g., an action query) or for both. However, other types of requests 320 are also within the scope of the present disclosure.

In some example embodiments, the configuring of the corresponding set of requests 320 for each programming stack client 310 may comprise specifying test data on which to execute a set of queries based on the usage metrics. For example, in a scenario where the usage metrics indicate that the historical requests executed on the cloud service 260 via a particular programming stack client 310 comprised queries that were performed on a particular portion of a database (e.g., specific tables, rows, columns, partitions, etc.), the validation system 200 may configure the set of requests 320 for that particular programming stack client 310 to comprise queries to be performed on the same particular portion of the database.

Additionally or alternatively, the configuring of the corresponding set of requests 320 for each programming stack client 310 in the plurality of programming stack clients 310 may comprise configuring a corresponding volume of the set of requests 320 for each programming stack client 310 based on a corresponding volume of the historical requests for the programming stack client 310 indicated by the usage metrics. For example, in a scenario where the usage metrics indicate that the total number of times that a particular type of query was executed on the cloud service 260 via a particular programming stack client 310 within the last 30 days is 1,328, the validation system 200 may configure the set of requests 320 for that particular programming stack client 310 to comprise 1,328 queries of that particular type of query.

The validation system 200 may then, for each programming stack client 310 in the plurality of programming stack clients 310, trigger execution of the corresponding set of requests 320 for the programming stack client 310 on the cloud service 260 via the programming stack client 310, at operation 520. For example, the validation system 200 may send one or more instructions to each programming stack client 310 to execute the corresponding set of requests 32 for the programming stack client 310 on the cloud service 260. The one or more instructions may include the set of requests 320.

Next, the validation system 200 may, at operation 530, obtain results of the execution of the sets of requests 320 for the plurality of programming stack clients 310 on the cloud service 260. For example, the sets of requests 320 may be executed on the cloud service 260, and the results of the execution of the sets of requests 320 may be stored in the database 250. The validation system 200 may obtain the stored results from the database 250, such as for use in further validation operations.

At operation 540, the validation system 200 may then cause an indication of the results to be displayed on a computing device. For example, the validation system 200 may perform one or more validation operations to compute a summary of the results for the different requests 320 for each programming stack client 310, such as corresponding indications of whether each request 320 passed or failed a validation standard (e.g., one or more criteria). As previously discussed, FIG. 4 illustrates an example of results of execution of sets of requests 320 being displayed within the graphical user interface 400. Other ways of causing the indication of the results to be displayed are also within the scope of the present disclosure.

It is contemplated that any of the other features described within the present disclosure can be incorporated into the method 500.

Figure 6:
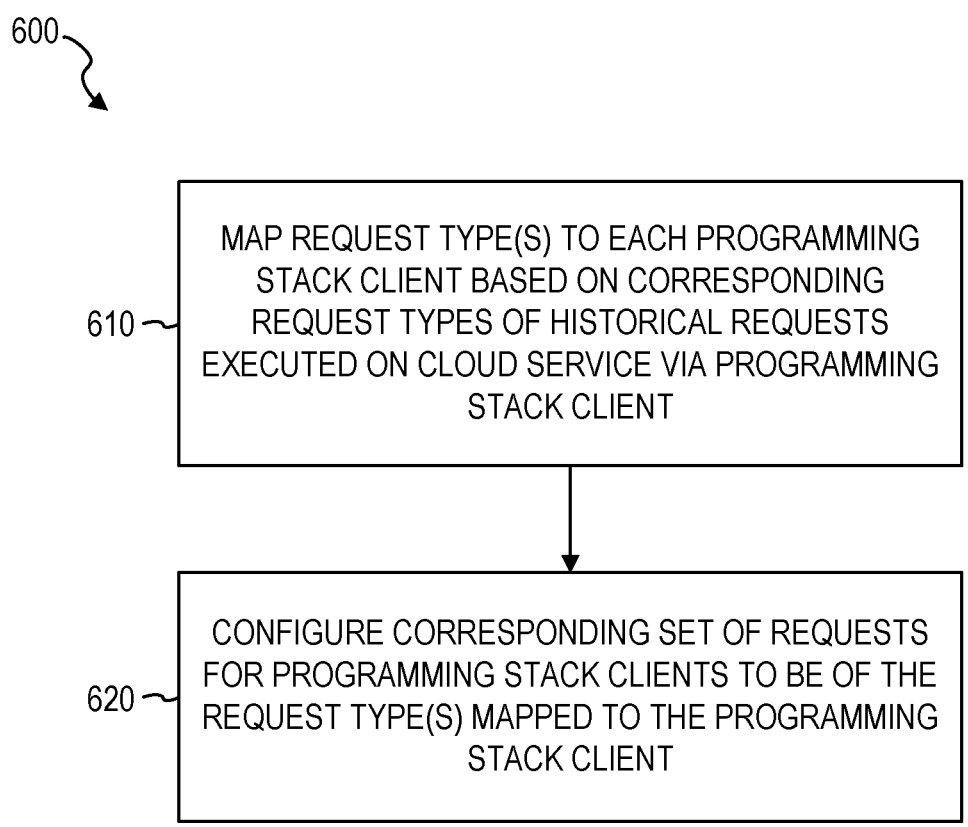
FIG. 6 is a flowchart illustrating an example method of configuring a corresponding set of requests for each programing stack client in a plurality of programming stack clients.

FIG. 6 is a flowchart illustrating an example method of configuring a corresponding set of requests for each programing stack client in a plurality of programming stack clients. The method 600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 600 are performed by one or more components of the validation system 200 of FIG. 2.

At operation 610, the validation system 200 may map one or more request types to each programming stack client 310 in the plurality of programming stack clients 310 based on corresponding request types of the historical requests executed on the cloud service 260 via the programming stack client 310. The one or more request types may comprise one or more types of queries. For example, the one or more request types may comprise a combination of one or more of collection SQL queries, graph SQL queries, transactional SQL queries, or analytical SQL queries. However, other types of request types and other types of queries are also within the scope of the present disclosure.

Next, the validation system 200 may, at operation 620, configure the corresponding set of requests 320 for the programming stack client 310 to be of the one or more request types mapped to the programming stack client 310. For example, the validation system 200 may configure the corresponding set of requests 320 for a first programming stack client 310 to include collection SQL queries and transactional SQL queries based on collection SQL queries and transaction SQL queries being mapped to the first programming stack client 310, while the validation system 200 may configure the corresponding set of requests 320 for a second programming stack client 310 to include collection SQL queries and analytical SQL queries based on collection SQL queries and analytical SQL queries being mapped to the second programming stack client 310.

It is contemplated that any of the other features described within the present disclosure can be incorporated into the method 600.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: configuring a corresponding set of requests for each programming stack client in a plurality of programming stack clients based on usage metrics of a cloud service, each programming stack client in the plurality of programming stack clients being configured to be used to build a software application for the cloud service, the usage metrics indicating historical requests executed on the cloud service via the plurality of programming stack clients; and, for each programming stack client in the plurality of programming stack clients, triggering execution of the corresponding set of requests for the programming stack client on the cloud service via the programming stack client.

Example 2 includes the computer-implemented method of example 1, wherein the cloud service comprises a database-as-a-service (DBaaS).

Example 3 includes the computer-implemented method of example 1 or example 2, wherein the corresponding set of requests for each programming stack client in the plurality of programming stack clients comprises a set of queries.

Example 4 includes the computer-implemented method of any one of examples 1 to 3, wherein the configuring the corresponding set of requests for each programming stack client in the plurality of programming stack clients comprises: specifying test data on which to execute the set of queries based on the usage metrics.

Example 5 includes the computer-implemented method of any one of examples 1 to 4, wherein the configuring the corresponding set of requests for each programming stack client in the plurality of programming stack clients comprises: configuring a corresponding volume of the set of requests for each programming stack client in the plurality of programming stack clients based on a corresponding volume of the historical requests for the programming stack client indicated by the usage metrics.

Example 6 includes the computer-implemented method of any one of examples 1 to 5, wherein the configuring the corresponding set of requests for each programming stack client in the plurality of programming stack clients comprises: mapping one or more request types to each programming stack client in the plurality of programming stack clients based on corresponding request types of the historical requests executed on the cloud service via the programming stack client; and configuring the corresponding set of requests for the programming stack client to be of the one or more request types mapped to the programming stack client.

Example 7 includes the computer-implemented method of any one of examples 1 to 6, wherein the one or more request types comprise one or more types of queries.

Example 8 includes the computer-implemented method of any one of examples 1 to 7, further comprising: obtaining results of the execution of the sets of requests for the plurality of programming stack clients on the cloud service; and causing an indication of the results to be displayed on a computing device.

Example 9 includes a system comprising: at least one processor; and a non-transitory computer-readable medium storing executable instructions that, when executed, cause the at least one processor to perform the method of any one of examples 1 to 8.

Example 10 includes a non-transitory machine-readable storage medium, tangibly embodying a set of instructions that, when executed by at least one processor, causes the at least one processor to perform the method of any one of examples 1 to 8.

Example 11 includes a machine-readable medium carrying a set of instructions that, when executed by at least one processor, causes the at least one processor to carry out the method of any one of examples 1 to 8.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 7:
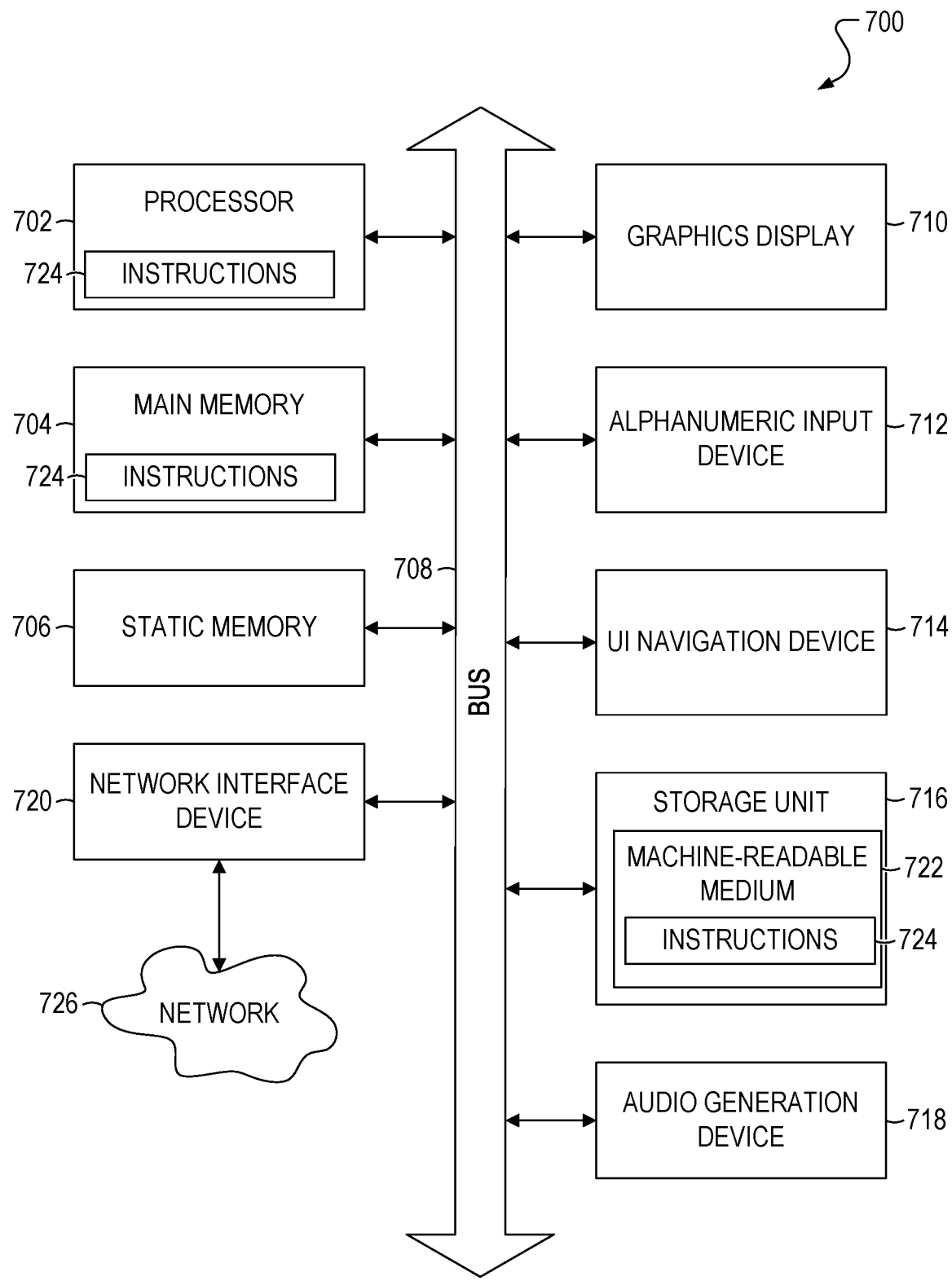
FIG. 7 is a block diagram of an example computer system on which methodologies described herein can be executed.

FIG. 7 is a block diagram of a machine in the example form of a computer system 700 within which instructions 724 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a graphics or video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a storage unit (e.g., a disk drive unit) 716, an audio or signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:

accessing a set of requests available to be executed by a cloud service;

accessing usage metrics indicating historical requests executed on the cloud service via a plurality of programming stack clients;

configuring a corresponding subset of cloud service validation requests, selected from among the set of requests available to be executed by the cloud service, for each programming stack client in the plurality of programming stack clients based on usage metrics of the cloud service, each programming stack client in the plurality of programming stack clients being configured to be used to build a software application for the cloud service; and for each programming stack client in the plurality of programming stack clients, triggering execution of the corresponding subset of validation requests for the programming stack client on the cloud service via the programming stack client.

2. The computer-implemented method of claim 1, wherein the cloud service comprises a database-as-a-service (DBaaS).

3. The computer-implemented method of claim 1, wherein the corresponding subset of requests for each programming stack client in the plurality of programming stack clients comprises a set of queries.

4. The computer-implemented method of claim 3, wherein the configuring the corresponding subset of requests for each programming stack client in the plurality of programming stack clients comprises:
specifying test data on which to execute the set of queries based on the usage metrics.

5. The computer-implemented method of claim 1, wherein the configuring the corresponding subset of requests for each programming stack client in the plurality of programming stack clients comprises:
configuring a corresponding volume of the subset of requests for each programming stack client in the plurality of programming stack clients based on a corresponding volume of the historical requests for the programming stack client indicated by the usage metrics.

6. The computer-implemented method of claim 1, wherein the configuring the corresponding subset of requests for each programming stack client in the plurality of programming stack clients comprises:
mapping one or more request types to each programming stack client in the plurality of programming stack clients based on corresponding request types of the historical requests executed on the cloud service via the programming stack client; and
configuring the corresponding subset of requests for the programming stack client to be of the one or more request types mapped to the programming stack client.

7. The computer-implemented method of claim 6, wherein the one or more request types comprise one or more types of queries.

8. The computer-implemented method of claim 1, further comprising:
obtaining results of the execution of the subsets of requests for the plurality of programming stack clients on the cloud service; and
causing an indication of the results to be displayed on a computing device.

9. A system of comprising:
at least one hardware processor; and
a non-transitory computer-readable medium storing executable instructions that, when executed, cause the at least one hardware processor to perform computer operations comprising:
accessing a set of requests available to be executed by a cloud service;
accessing usage metrics indicating historical requests executed on the cloud service via a plurality of programming stack clients;
configuring a corresponding subset of cloud service validation requests, selected from among the set of requests available to be executed by the cloud service, for each programming stack client in the plurality of programming stack clients based on usage metrics of the cloud service, each programming stack client in the plurality of programming stack clients being configured to be used to build a software application for the cloud service; and
for each programming stack client in the plurality of programming stack clients, triggering execution of the corresponding subset of validation requests for the programming stack client on the cloud service via the programming stack client.

10. The system of claim 9, wherein the cloud service comprises a database-as-a-service (DBaaS).

11. The system of claim 9, wherein the corresponding subset of requests for each programming stack client in the plurality of programming stack clients comprises a set of queries.

12. The system of claim 11, wherein the configuring the corresponding subset of requests for each programming stack client in the plurality of programming stack clients comprises:
specifying test data on which to execute the set of queries based on the usage metrics.

13. The system of claim 9, wherein the configuring the corresponding subset of requests for each programming stack client in the plurality of programming stack clients comprises:
configuring a corresponding volume of the subset of requests for each programming stack client in the plurality of programming stack clients based on a corresponding volume of the historical requests for the programming stack client indicated by the usage metrics.

14. The system of claim 9, wherein the configuring the corresponding subset of requests for each programming stack client in the plurality of programming stack clients comprises:
mapping one or more request types to each programming stack client in the plurality of programming stack clients based on corresponding request types of the historical requests executed on the cloud service via the programming stack client; and
configuring the corresponding subset of requests for the programming stack client to be of the one or more request types mapped to the programming stack client.

15. The system of claim 14, wherein the one or more request types comprise one or more types of queries.

16. The system of claim 9, wherein the computer operations further comprise:
obtaining results of the execution of the subsets of requests for the plurality of programming stack clients on the cloud service; and
causing an indication of the results to be displayed on a computing device.

17. A non-transitory machine-readable storage medium tangibly embodying a set of instructions that, when executed by at least one hardware processor, causes the at least one hardware processor to perform computer operations comprising:
accessing a set of requests available to be executed by a cloud service;
accessing usage metrics indicating historical requests executed on the cloud service via a plurality of programming stack clients;
configuring a corresponding subset of cloud service validation requests, selected from among the set of requests available to be executed by the cloud service, for each programming stack client in the plurality of programming stack clients based on usage metrics of the cloud service, each programming stack client in the plurality of programming stack clients being configured to be used to build a software application for the cloud service; and for each programming stack client in the plurality of programming stack clients, triggering execution of the corresponding subset of validation requests for the programming stack client on the cloud service via the programming stack client.

18. The non-transitory machine-readable storage medium of claim 17, wherein the cloud service comprises a database-as-a-service (DBaaS).

19. The non-transitory machine-readable storage medium of claim 17, wherein the corresponding subset of requests for each programming stack client in the plurality of programming stack clients comprises a set of queries.

20. The non-transitory machine-readable storage medium of claim 19, wherein the configuring the corresponding subset of requests for each programming stack client in the plurality of programming stack clients comprises:

specifying test data on which to execute the set of queries based on the usage metrics.

* * * * *